(12) United States Patent
Kaneda et al.

(10) Patent No.: US 10,505,641 B2
(45) Date of Patent: Dec. 10, 2019

(54) CLOCK RECOVERY FOR BAND-LIMITED OPTICAL CHANNELS

(71) Applicant: Nokia Solutions and Networks OY, Espoo (FI)

(72) Inventors: Noriaki Kaneda, Westfield, NJ (US); Stephan Weisser, Nuremberg (DE); Carlo Costantini, Rome (IT)

(73) Assignee: Nokia Solutions and Networks OY, Espoo (FI)

(*) Notice: Subject to any disclaimer, the term of this patent is extended or adjusted under 35 U.S.C. 154(b) by 0 days.

(21) Appl. No.: 15/966,697

(22) Filed: Apr. 30, 2018

(65) Prior Publication Data
US 2019/0334627 A1 Oct. 31, 2019

(51) Int. Cl.
*H04B 10/61* (2013.01)
*H04B 10/63* (2013.01)

(52) U.S. Cl.
CPC ....... *H04B 10/6161* (2013.01); *H04B 10/611* (2013.01); *H04B 10/613* (2013.01); *H04B 10/614* (2013.01); *H04B 10/6162* (2013.01); *H04B 10/6166* (2013.01); *H04B 10/63* (2013.01)

(58) Field of Classification Search
CPC .................. H04B 10/616–10/6166
See application file for complete search history.

(56) References Cited

U.S. PATENT DOCUMENTS

| | | | |
|---|---|---|---|
| 7,266,310 B1 | 9/2007 | Savory et al. | |
| 7,636,252 B2 | 12/2009 | Bontu et al. | |
| 7,636,525 B1 | 12/2009 | Bontu et al. | |
| 7,747,177 B2 | 6/2010 | Chen et al. | |
| 7,809,284 B2 | 10/2010 | Kaneda et al. | |
| 8,095,019 B2 | 1/2012 | Kaneda et al. | |
| 8,260,154 B2 | 9/2012 | Chang et al. | |

(Continued)

OTHER PUBLICATIONS

Fludger, C.R.S., et al., "Jitter tolerant clock recovery for coherent optical receivers," Optical Fiber Communication Conference and Exposition and the National Fiber Optic Engineers Conference (OFC/NFOEC), 2013, (3 pages).

(Continued)

*Primary Examiner* — Shi K Li
(74) *Attorney, Agent, or Firm* — Mendelsohn Dunleavy, P.C.; Yuri Gruzdkov (57) ABSTRACT

A coherent optical receiver in which the channel equalizer and the clock-recovery circuit are connected in a nested-loop configuration, wherein the channel estimate generated by the equalizer is used to adjust the phase of the clock signal generated by the clock-recovery circuit. The channel equalizer can be implemented using a bank of time-domain or frequency-domain FIR filters. In an example embodiment, the clock-recovery circuit is configured to track the phase rotation corresponding to the equalized signals in a frequency-dependent manner; track the phase rotation in the channel equalizer either in a frequency-dependent manner or based on the mean signal delay therein; and adjust the phase of the clock signal based on an effective difference between these two phase rotations. The clock-recovery circuit enhances the clock tone by applying a Fourier transform to the squared absolute values of the equalized signals outputted by the channel equalizer.

21 Claims, 5 Drawing Sheets

(56) References Cited

U.S. PATENT DOCUMENTS

| | | |
|---|---|---|
| 8,275,224 B2 | 9/2012 | Doerr |
| 8,655,191 B2 | 2/2014 | Kaneda et al. |
| 9,020,364 B2 | 4/2015 | Xie et al. |
| 9,036,999 B2 | 5/2015 | Kaneda et al. |
| 9,077,455 B2 | 7/2015 | Randel et al. |
| 9,571,206 B2 | 2/2017 | Xie |
| 9,762,379 B2 | 9/2017 | Kaneda |
| 9,847,841 B1 | 12/2017 | Kaneda |
| 2008/0152361 A1 | 6/2008 | Chen et al. |
| 2012/0274364 A1* | 11/2012 | Chen .................. H03M 1/0836 327/101 |
| 2013/0230312 A1 | 9/2013 | Randel et al. |
| 2013/0243420 A1* | 9/2013 | Li ...................... H04B 10/6162 398/25 |
| 2015/0372764 A1* | 12/2015 | Kaneda ................ H04B 10/616 398/115 |

OTHER PUBLICATIONS

Mussolin, Marco, "Digital Signal Processing Algorithms for High-Speed Coherent Transmission in Optical Fibers," 2010, [Retrieved on Apr. 11, 2018] Retrieved from the Internet: <URL: http://tesi.cab.unipd.it/23520/1/Marco_Mussolin_586128.pdf> (85 pages).

Wu, Kuang-Tsan et al., "Frequency-Domain Clock Phase Detector for Nyquist WDM Systems," 2014, Optical Fiber Communications Conference and Exhibition (OFC), (3 pages).

\* cited by examiner

CLOCK RECOVERY FOR BAND-LIMITED OPTICAL CHANNELS

BACKGROUND

Field

Various example embodiments relate to optical communication equipment and, more specifically but not exclusively, to optical receivers.

Description of the Related Art

This section introduces aspects that may help facilitate a better understanding of the disclosure. Accordingly, the statements of this section are to be read in this light and are not to be understood as admissions about what is in the prior art or what is not in the prior art.

Clock recovery is the process of extracting timing information from a signal carrying a serial data stream that enables the receiver to properly decode the transmitted symbols. When the communication channel does not transmit a separate clock signal along with the data signal, the clock needs to be regenerated (recovered) at the receiver using some inherent properties of the received data-carrying signal. Clock-recovery circuits used for this purpose are employed in many different systems, including but not limited to wire-line, fiber-optic, and wireless communication systems.

SUMMARY OF SOME SPECIFIC EMBODIMENTS

Disclosed herein are various embodiments of a coherent optical receiver in which the channel equalizer and the clock-recovery circuit are connected in a nested-loop configuration, wherein the channel estimate generated by the equalizer is used to adjust the phase of the clock signal generated by the clock-recovery circuit. The channel equalizer can be implemented using a bank of time-domain or frequency-domain finite-impulse-response (FIR) filters. In an example embodiment, the clock-recovery circuit is configured to: (i) track the phase rotation corresponding to the equalized signals in a frequency-dependent manner; (ii) track the phase rotation in the channel equalizer either in a frequency-dependent manner or based on the mean signal delay therein; and (iii) adjust the phase of the clock signal based on an effective difference between these two phase rotations. The clock-recovery circuit enhances the clock tone by applying a Fourier transform to the squared absolute values of the equalized signals outputted by the channel equalizer.

A clock-recovery circuit operating in this manner is advantageously capable of reliably recovering the clock from an optical data signal subjected to narrow band-pass filtering that typically causes severe attenuation of the clock tones and a corresponding malfunction of conventional clock-recovery circuits and/or algorithms.

According to an example embodiment, provided is an apparatus comprising an optical data receiver that comprises: an optical front end configured to mix an optical data signal and an optical local-oscillator signal to generate a plurality of electrical digital measures of the optical data signal; and a digital signal processor configured to: (i) generate a first plurality of digital samples in response to receiving the plurality of electrical digital measures from the optical front end, said generating being performed using a clock signal; (ii) generate a second plurality of digital samples by digitally filtering the first plurality of digital samples, said filtering being performed using a transfer function; (iii) generate the clock signal using the transfer function and at least some of the second plurality of digital samples; and (iv) recover data encoded in the optical data signal using the second plurality of digital samples.

According to another example embodiment, provided is an apparatus comprising a digital signal processor that comprises: a channel equalizer configured to generate a second plurality of digital samples by digitally filtering a first plurality of digital samples, said filtering being performed using a transfer function, said first plurality of digital samples corresponding to an input data signal and being generated using a clock signal; a clock-recovery circuit configured to generate the clock signal using the transfer function and at least some of the second plurality of digital samples; and a signal decoder configured to recover data encoded in the input data signal using the second plurality of digital samples.

According to yet another example embodiment, provided is an apparatus comprising an optical data receiver that comprises: (i) an optical front end that comprises: an optical hybrid configured to mix an optical data signal and an optical local-oscillator signal to generate a plurality of mixed optical signals; and a plurality of photodetectors configured to generate a plurality of electrical digital measures of the optical data signal in response to the mixed optical signals; and (ii) a digital signal processor that comprises: a digital equalizing filter configured to generate a second plurality of digital samples by digitally filtering a first plurality of digital samples, said filtering being performed using a transfer function, said first plurality of digital samples being generated in response to the plurality of electrical digital measures and using a clock signal; a clock-recovery circuit configured to generate the clock signal using at least some of the second plurality of digital samples and further using the transfer function; and a signal decoder configured to recover data encoded in the optical data signal using the second plurality of digital samples.

BRIEF DESCRIPTION OF THE DRAWINGS

Other aspects, features, and benefits of various disclosed embodiments will become more fully apparent, by way of example, from the following detailed description and the accompanying drawings, in which.

DETAILED DESCRIPTION

A representative conventional clock-recovery method (e.g., the Gardner method) relies on the presence of a clock tone in the timing-error signal generated to determine the sign and magnitude of the clock adjustment that is needed to maintain synchronization between the signal processing performed at the receiver and the received data signal. A clock tone is typically located at a frequency that is offset by 1/T from the carrier frequency, where T is the symbol period. The timing-error signal corresponding to an optical communications signal may have two such clock tones, one on each side of the carrier. However, for optical signals having a bandwidth that is close to or narrower than 1/T, the clock tones tend to be greatly attenuated, which disadvantageously degrades the performance of conventional clock-recovery circuits or causes them to malfunction.

Optical networks often use reconfigurable optical add-drop multiplexers and other optical filters that subject the transmitted optical signals to narrow band-pass filtering, with the corresponding bandwidth being close to or narrower than 1/T Hz. There is therefore a pressing need for clock-recovery methods and circuits that can handle such band-limited optical signals. Various embodiments disclosed herein in reference to FIGS. 1-5 can be used to address this pressing need.

Figure 1:
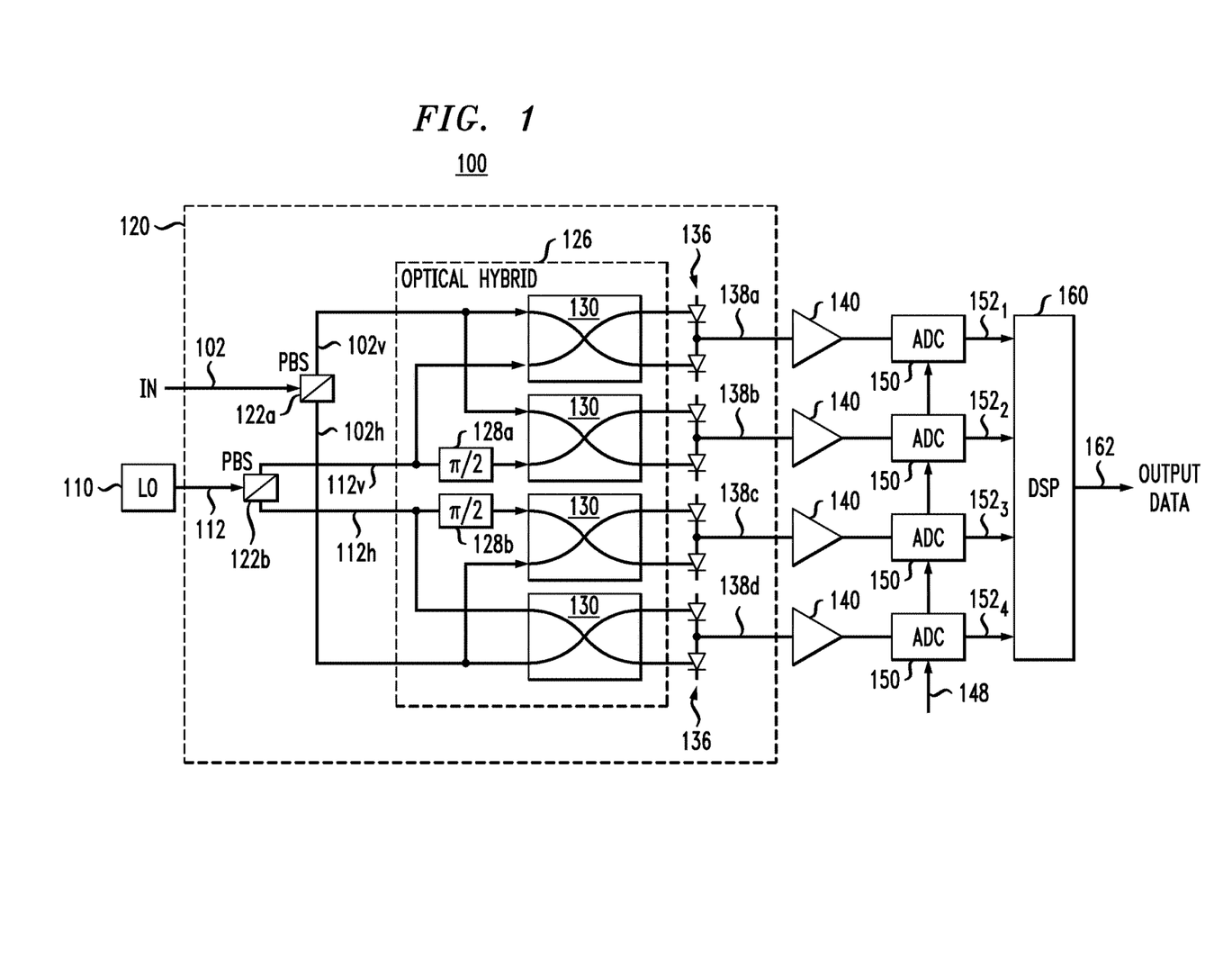
FIG. 1 shows a block diagram of an optical receiver according to an embodiment.

FIG. 1 shows a block diagram of a coherent optical receiver 100 according to an embodiment. Receiver 100 is configured to receive a polarization-division-multiplexed (PDM) optical signal 102, e.g., via an optical fiber, from a remote transmitter (not explicitly shown in FIG. 1). Optical signal 102 is applied to an optical-to-electrical (O/E) converter 120 that converts that optical signal into four corresponding electrical signals 138a-138d. Each of electrical signals 138a-138d may optionally be amplified in a corresponding amplifier 140 coupled to a corresponding analog-to-digital converter (ADC) 150. Each ADC 150 samples the output of the corresponding amplifier 140 at an appropriate sampling frequency and sampling phase(s) set by a control signal 148 to produce a corresponding one of four digital electrical signals 152a-152d. Digital signals 152a-152d are applied to a digital signal processor (DSP) 160 that processes these signals, e.g., as described in more detail below in reference to FIG. 2, to recover the data streams originally encoded onto the two polarization components of optical signal 102 at the remote transmitter. DSP 160 outputs the recovered data via an output data signal 162.

Control signal 148 is typically used to configure ADCs 150 to sample their respective input signals at a sampling rate that causes each ADC to generate a desired number of (e.g., two) signal samples per symbol period T. In some embodiments, control signal 148 may have a frequency that is two times higher than the nominal symbol rate of optical signal 102, but otherwise is not synchronized with the internal clock of the optical signal. In some other embodiments, control signal 148 may be generated using the described herein below clock-recovery circuit 270 (FIGS. 2, 3, 5) of DSP 160 and then fed back to ADCs 150, e.g., as described in U.S. Pat. No. 9,762,379, which is incorporated herein by reference in its entirety.

O/E converter 120 implements a polarization-diversity homodyne- or intradyne-detection scheme using an optical local-oscillator (OLO) signal 112 generated by a laser 110. In an example embodiment shown in FIG. 1, O/E converter 120 comprises polarization beam splitters (PBSs) 122a and 122b configured to decompose optical signals 102 and 112, respectively, into two respective orthogonally polarized components, illustratively vertically polarized components 102v and 112v and horizontally polarized components 102h and 112h. These polarization components are then directed to an optical hybrid 126.

Optical hybrid 126 operates to split each of polarization components 102v, 112v, 102h, and 112h into two (e.g., attenuated) copies, e.g., using a conventional 3-dB power splitter (not explicitly shown in FIG. 1). A relative phase shift of about 90 degrees ($\pi/2$ radian) is then applied to one copy of component 112v and one copy of component 112h using phase shifters 128a and 128b, respectively. The various copies of signals 102v, 112v, 102h, and 112h are optically mixed with each other as indicated in FIG. 1 using a plurality of optical signal mixers 130, and the mixed signals produced by the mixers are detected by eight photodetectors (e.g., photodiodes) 136. Photodetectors 136 are arranged in balanced pairs, e.g., as shown in FIG. 1, and the output of each photodetector pair is a corresponding one of electrical signals 138a-138d. This configuration of photodetectors 136 is a differential configuration that helps to reduce noise and improve DC balancing.

In one alternative embodiment, O/E converter 120 may have four photodetectors 136, one per optical signal mixer 130, configured for single-ended detection of the corresponding optical signals. In another alternative embodiment, optical hybrid 126 may be replaced by a suitable optical coupler, which are known to persons skilled in the pertinent art and/or are commercially available. Example optical circuits that can be used to implement optical hybrid 126 in optical receiver 100 are described, e.g., in U.S. Pat. Nos. 7,809,284 and 8,275,224, both of which are incorporated herein by reference in their entirety.

In an example embodiment, DSP 160 performs (i) signal equalization, (ii) clock recovery, and (iii) carrier- and data-recovery processing. Signal equalization is generally directed at reducing the detrimental effects of various signal impairments imparted onto optical signal 102 in the corresponding optical-transport link. Such signal impairments might include, but are not limited to polarization distortion, chromatic dispersion (CD), polarization-mode dispersion, additive noise, and other linear and nonlinear forms of signal distortion. Clock recovery is generally directed at synchronizing the digital signal processing performed in DSP 160 with the internal clock of optical signal 102. The carrier- and data-recovery processing is generally directed at recovering the transmitted data.

Figure 2:
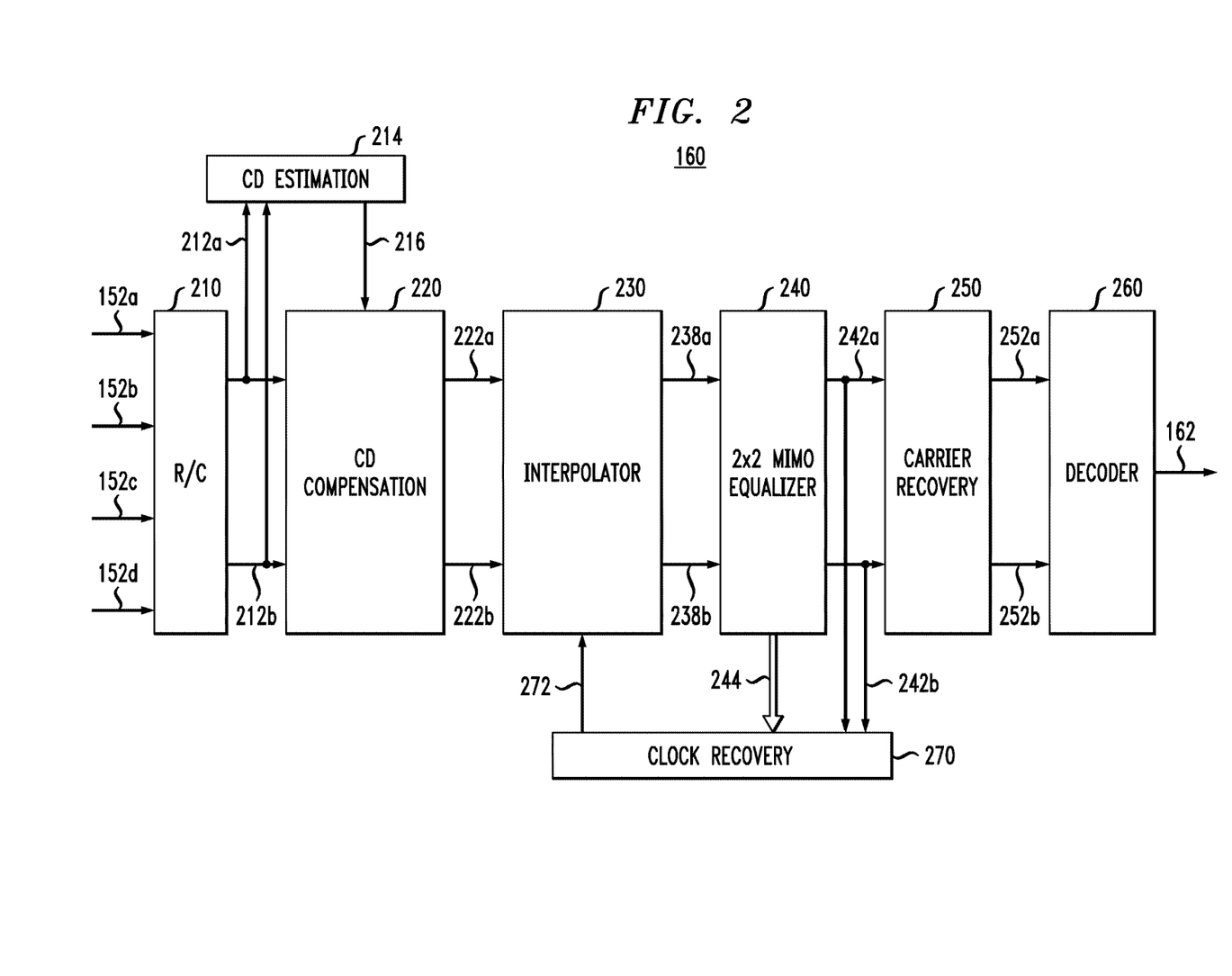
FIG. 2 shows a block diagram of a digital signal processor (DSP) that can be used in the optical receiver of FIG. 1 according to an embodiment.

FIG. 2 shows a block diagram of DSP 160 (FIG. 1) according to an embodiment. As already indicated above, DSP 160 is configured to generate output data signal 162 in response to digital signals 152a-152d (also see FIG. 1).

Ideally, digital signals 152a and 152b represent the I and Q components, respectively, of the first polarization component (e.g., X) of optical signal 102, and digital signals 152c and 152d represent the I and Q components, respectively, of the second polarization component (e.g., Y) of that optical signal. However, optical-link impairments, receiver-implementation imperfections, and configuration inaccuracies generally cause each of digital signals 152a-152d to be a convoluted signal that has various signal distortions and/or contributions from both of the original polarization components generated at the remote optical transmitter. The train of signal processing implemented in DSP 160 is generally directed at reducing the adverse effects of various signal distortions and de-convolving digital signals 152a-152d so that the transmitted data can be properly recovered to generate output data signal 162.

DSP 160 comprises a real-to-complex (R/C) signal converter 210 configured to convert the real-valued signal samples received via digital signals 152a-152d into the corresponding complex-valued signal samples that are then directed downstream, along the signal processing pipeline of the DSP, via digital signals 212a and 212b.

In some embodiments, R/C signal converter 210 may also be configured to reduce signal distortions imposed by the front-end 120/140/150 of optical receiver 100 (see FIG. 1). These distortions may be caused, e.g., by incorrect biasing of various electro-optical components in O/E converter 120, imperfect signal splitting in power and polarization splitters and optical couplers, frequency dependence and variability of O/E conversion characteristics of the photo-detectors, deskews among the four ADCs 150 (FIG. 1), etc. Example signal-processing methods that can be implemented in R/C signal converter 210 for this purpose are disclosed, e.g., in U.S. Pat. No. 9,847,841, which is incorporated herein by reference in its entirety.

Complex-valued digital signals 212a and 212b are applied to a CD compensation (CDC) module 220 for CDC processing therein, and the resulting CDC-processed signals are complex-valued digital signals 222a and 222b. A CDC controller 214 serves to generate a control signal 216 that appropriately configures various configurable elements within CDC module 220 to significantly reduce or substantially cancel the detrimental effects of chromatic dispersion caused by the optical transport link configured to feed optical signal 102 into optical receiver 100. In an example embodiment, CDC controller 214 may generate control signal 216 by estimating, based on digital signals 212a and 212b, the group delay in the optical transport link and then determining a configuration of CDC module 220 that compensates the estimated group delay. Example signal-processing methods that can be adapted for generating control signal 216 are disclosed, e.g., in U.S. Pat. Nos. 8,260,154, 7,636,525, 7,266,310, all of which are incorporated herein by reference in their entirety.

Digital signals 222a and 222b generated by CDC module 220 are applied to a signal interpolator 230. The signal processing implemented in signal interpolator 230 converts digital signals 222a and 222b into digital signals 238a and 238b. More specifically, interpolator 230 operates to: (i) interpolate digital signal 222a, and (ii) resample the resulting interpolated digital signal at the phases that are determined based on a control signal 272 generated by a clock-recovery circuit 270, e.g., as described in more detail below in reference to FIGS. 3-5, thereby generating digital signal 238a. Interpolator 230 similarly operates to: (i) interpolate digital signal 222b, and (ii) resample the resulting interpolated digital signal at the phases determined based on control signal 272 to generate digital signal 238b.

Digital signals 238a and 238b outputted by interpolator 230 are applied to a channel equalizer 240 (illustratively, a 2×2 multiple-input/multiple-output (MIMO) equalizer) for MIMO-equalization processing therein, and the resulting equalized signals are complex-valued digital signals 242a and 242b. In an example embodiment, channel equalizer 240 is configured to generate complex-valued digital signals 242a and 242b by mixing complex-valued digital signals 238a and 238b in accordance with Eqs. (1a) and (1b):

$$r_1(n) = h_{11}(n) * x_1(n) + h_{12}(n) * x_2(n) \tag{1a}$$

$$r_2(n) = h_{21}(n) * x_1(n) + h_{22}(n) * x_2(n) \tag{1b}$$

where $r_1(n)$ is a complex value carried by signal 242a; $r_2(n)$ is a complex value carried by signal 242b; $x_1(n)$ is a string of complex values in signal 238a; $x_2(n)$ is a string of complex values in signal 238b; n is the time-slot index; the "*" symbol denotes the convolution operation; and $h_{11}$, $h_{12}$, $h_{21}$, and $h_{22}$ are the matrix elements of the transfer function $$H = \begin{pmatrix} h_{11} & h_{12} \\ h_{21} & h_{22} \end{pmatrix}$$

of channel equalizer 240. In an example embodiment, each of $x_1$, $x_2$, $h_{11}$, $h_{12}$, $h_{21}$, and $h_{22}$ can be a respective finite-length vector of complex values that represent the configurations of the corresponding multi-tap finite-impulse-response filters used in equalizer 240.

Equalizer 240 is further configured to supply the equalization coefficients representing the matrix elements $h_{11}$, $h_{12}$, $h_{21}$, and $h_{22}$ to clock-recovery circuit 270 by way of a control signal 244.

In an example embodiment, equalizer 240 can be configured to perform at least some of the following: (i) electronic polarization demultiplexing; and (ii) digital signal processing directed at reducing the adverse effects of one or more above-indicated signal impairments, such as polarization-mode dispersion, polarization-dependent loss, inter-symbol interference, residual chromatic dispersion, etc. Example digital circuits that can be used to implement channel equalizer 240 are disclosed, e.g., in U.S. Pat. Nos. 9,077,455 and 9,020,364, both of which are incorporated herein by reference in their entirety.

For example, channel equalizer 240 can be implemented using a bank of finite-impulse-response (FIR) filters. In some embodiments, the FIR filters used in channel equalizer 240 can be time-domain FIR filters. In some other embodiments, the FIR filters used in channel equalizer 240 can be frequency-domain FIR filters.

In a frequency-domain implementation of channel equalizer 240, each of the matrix elements $h_{11}$, $h_{12}$, $h_{21}$, and $h_{22}$ can be represented by a respective frequency-dependent discrete function $H_{ij}(f)$ defined using a respective set of M complex values ($H_{ij}^{(1)}, H_{ij}^{(2)}, \ldots, H_{ij}^{(M)}$), where i=1, 2 and j=1, 2. Accordingly, control signal 244 can be configured to supply four such sets to clock-recovery circuit 270.

In a time-domain implementation of equalizer 240, each of the matrix elements $h_{11}$, $h_{12}$, $h_{21}$, and $h_{22}$ can be represented by a respective set of M FIR-filter tap coefficients ($C_{ij}^{(1)}, C_{ij}^{(2)}, \ldots, C_{ij}^{(M)}$). Accordingly, control signal 244 can be configured to supply four such sets to clock-recovery circuit 270.

A person of ordinary skill in the art will understand that the FIR-filter tap coefficients ($C_{ij}^{(1)}, C_{ij}^{(2)}, \ldots, C_{ij}^{(M)}$) used in the FIR-filter's time-domain implementation and the discrete transfer function $H_{ij}(f) = (H_{ij}^{(1)}, H_{ij}^{(2)}, \ldots, H_{ij}^{(M)})$ used in the FIR-filter's frequency-domain implementation can be related to one another using Eq. (2):

$$H_{ij}^{(k)} = \sum_{m=1}^{M} C_{ij}^{(m)} e^{-2\pi j(m-1)k/M} \tag{2}$$

Based on Eq. (2), a conventional equalization algorithm (such as a constant modulus algorithm, CMA) that can be used in the calculation of tap coefficients $C^{(m)}$ for a time-domain FIR filter can also be adapted for the calculation of the discrete transfer function H(f) for the frequency-domain implementation thereof. A person of ordinary skill in the art will also understand that convolution in the time domain is equivalent to multiplication in the frequency domain.

In an example embodiment, clock-recovery circuit 270 can generate control signal 272 using control signal 244 and copies of equalizer-output signals 242a and 242b, e.g., as described in more detail below in reference to FIGS. 3-5. In some embodiments, clock-recovery circuit 270 can be configured to generate control signal 272 using control signal 244 and a copy of only one of the equalizer-output signals 242a and 242b.

Equalizer-output signals 242a and 242b are applied to a carrier-recovery module 250. Together with a signal decoder 260, carrier-recovery module 250 carries out the above-mentioned carrier- and data-recovery processing, which is generally directed at compensating the frequency mismatch between the carrier frequencies of LO signal 112 and optical signal 102, reducing the effects of phase noise, and recovering the transmitted data. Various signal-processing techniques that can be used to implement the frequency-mismatch compensation are disclosed, e.g., in U.S. Pat. No. 7,747,177 and U.S. Patent Application Publication No. 2008/0152361, both of which are incorporated herein by reference in their entirety. Example signal-processing techniques that can be used to implement phase-error correction are disclosed, e.g., in U.S. Patent Application Publication No. 2013/0230312, which is incorporated herein by reference in its entirety.

Digital signals 252a and 252b generated by carrier-recovery module 250 are applied to decoder 260. Decoder 260 is configured to use the complex values conveyed by digital signals 252a and 252b to appropriately map each received symbol onto the operative constellation and, based on said mapping, recover the corresponding data. Decoder 260 then appropriately multiplexes the data recovered from digital signals 252a and 252b, respectively, to generate output data signal 162.

In some embodiments, decoder 260 may perform digital signal processing that implements error correction based on data redundancies (if any) in optical signal 102. Many forward-error-correction (FEC) methods suitable for this purpose are known to those skilled in the pertinent art.

Figure 3:
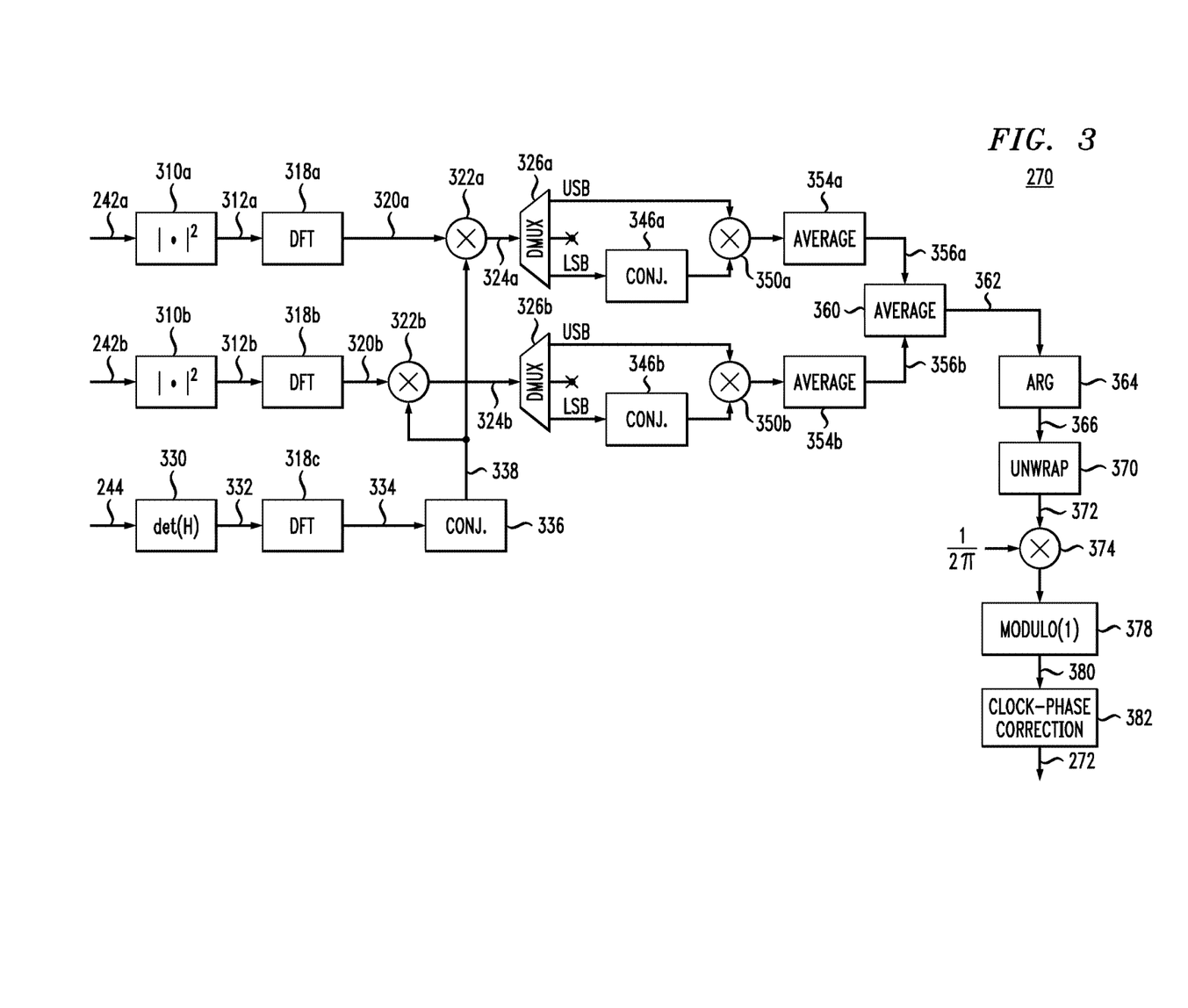
FIG. 3 shows a block diagram of a clock-recovery circuit that can be used in the DSP of FIG. 2 according to an embodiment.

FIG. 3 shows a block diagram of clock-recovery circuit 270 according to an embodiment. As already indicated above, clock-recovery circuit 270 generates control signal 272 for interpolator 230 in response to signals 242a, 242b, and 244 received from channel equalizer 240. Control signal 272 is then used to adaptively set the clock phases and the clock frequency, using which interpolator 230 generates digital samples for signals 238a and 238b. In some embodiments, clock-recovery circuit 270 may implement method 400 (see FIG. 4).

Circuit 270 comprises squaring modules 310a and 310b connected as indicated in FIG. 3. Squaring modules 310a and 310b are configured to generate digital signals 312a and 312b, respectively, in accordance with Eqs. (3a) and (3b):

$$A(n) = r_1(n) r_1^*(n) \quad (3a)$$

$$B(n) = r_2(n) r_2^*(n) \quad (3b)$$

where $A(n)$ is the value of digital signal 312a in the n-th time slot; $B(n)$ is the value of digital signal 312b in the n-th time slot; $r_1(n)$ is the value of digital signal 242a in the n-th time slot; $r_2(n)$ is the value of digital signal 242b in the n-th time slot; and the "*" in the superscript denotes the complex conjugate.

The squaring operation performed by squaring modules 310a and 310b is functionally beneficial for at least two reasons. One reason is that it can enhance the clock tone, e.g., in digital signals 320 (described below), which helps to achieve robust processing of band-limited optical signals wherein the clock tone may be greatly attenuated. Another reason is that it enables the Fourier transforms to be performed on real-valued signals, e.g., digital signals 312a and 312b, which helps to reduce the circuit complexity.

A discrete-Fourier-transform (DFT) module 318a operates to apply a discrete Fourier transform to each input set A of L digital values $\{A(n_0), A(n_0+1), \ldots, A(n_0+L-1)\}$ supplied by input digital signal 312a to generate a corresponding output set $R_1$ of L spectral samples $\{R_1(f_0), R_1(f_0+\Delta f), R_1(f_0+(L-1)\Delta f)\}$ for an output digital signal 320a, where $n_0$ is the time index of the first time slot of the input set A; $f_0$ is the frequency corresponding to the first spectral sample of the output set $R_1$; and $\Delta f (=2\pi/T)$ is the frequency increment, where T is the symbol period. A DFT module 318b similarly operates to apply a discrete Fourier transform to each input set B of L digital values $\{B(n_0), B(n_0+1), \ldots, B(n_0+L-1)\}$ supplied by input digital signal 312b to generate a corresponding output set $R_2$ of L spectral samples $\{R_2(f_0), R_2(f_0+\Delta f), \ldots, R_2(f_0+(L-1)\Delta f)\}$ for an output digital signal 320b, where $n_0$ is the time index of the first time slot of the input set A; $f_0$ is the frequency corresponding to the first spectral sample of the output set $R_1$; and $\Delta f (=2\pi/T)$ is the frequency increment, where T is the symbol period.

Circuit 270 further comprises a determinant module 330 is configured to compute the determinant of the transfer function H (denoted as det(H)) of equalizer 240 in accordance with Eq. (4):

$$\det(H) = h_{11} * h_{22} - h_{12} * h_{21} \quad (4)$$

where $h_{11}$, $h_{12}$, $h_{21}$, and $h_{22}$ are the matrix elements of the transfer function $$H = \begin{pmatrix} h_{11} & h_{12} \\ h_{21} & h_{22} \end{pmatrix}$$

of channel equalizer 240; and "*" symbol denotes the inner product. Module 330 is further configured to supply the computed values of det(H) to a DFT module 318c by way of a digital signal 332.

A DFT module 318c operates to apply a discrete Fourier transform to the received values of det(H) to generate a corresponding set D of spectral samples $\{D(f_0), D(f_0+\Delta f), \ldots, D(f_0+(L-1)\Delta f)\}$. In an example embodiment, prior to applying the Fourier transform, DFT module 318a may need to apply a zero-fill operation to each set of M values received from determinant module 330. The zero-fill or other suitable signal interpolation is generally needed because the size L of the discrete Fourier transform performed by DFT modules 318a and 318b is typically different from the length M of the FIR filters used in channel equalizer 240. In a typical embodiment, L>M, for example, L=128 and M=26. This relationship between L and M is typically due to the fact that (i) it is usually more beneficial to have a relatively small M, e.g., due to the resulting lower latency of channel equalizer 240 and (ii) it is usually more beneficial to have a relatively large L for better averaging and/or more-stable operation of clock-recovery circuit 270.

Nevertheless, in some embodiments, the numbers L and M may be equal. In such embodiments, the application of the zero-fill or other suitable signal interpolation in DFT module 318c may not be needed.

In an example embodiment, DFT module 318c further operates to generate a digital output signal 334 by (i) presenting each complex number $D_l$ from the set D in the form of $D_{0,l} \times \exp(j\Phi_l)$, where $D_{0,l}$ and $\Phi_l$ are the complex-number amplitude and argument, respectively; and (ii) using the resulting set of values {exp(jΦ$_l$)} for generating digital output signal 334.

In an alternative embodiment, DFT module 318c further operates to generate digital output signal 334 by outputting the spectral samples of the generated set D.

A conjugation module 336 is configured to generate a digital signal 338 by applying complex conjugation to the complex values supplied thereto by digital signal 334, thereby transforming each of such values into a corresponding complex-conjugated value whose exponent can be expressed as exp(−jΦ$_l$).

Two copies of digital signal 338 are applied to multipliers 322a and 322b, respectively.

Multiplier 322a is configured to transform each set R$_1$ received by way of digital signal 320a into a corresponding set R$_1$' in accordance with Eq. (5):

$$R_1'(f_0+l\Delta f) = R_1(f_0+l\Delta f) \times \exp(-j\Phi_l) \quad (5)$$

where l=0, 1, 2, . . . , L−1; R$_1$'(f$_0$+lΔf) denotes the L frequency components of the set R$_1$'; R$_1$(f$_0$+lΔf) denotes the L frequency components of the set R$_1$; and exp(−jΦ$_l$) denotes the corresponding L complex values received by way of digital signal 338. A person of ordinary skill in the art will understand that the effect of the multiplication by the exponential factor used in Eq. (5) is the phase rotation for the corresponding complex value R$_1$. Multiplier 322a is further configured to supply the computed set R$_1$' to a demultiplexer 326a by way of a digital signal 324a.

Multiplier 322b is similarly configured to transform each set R$_2$ received by way of digital signal 320b into a corresponding set R$_2$' in accordance with Eq. (6):

$$R_2'(f_0+l\Delta f) = R_2(f_0+l\Delta f) \times \exp(-j\Phi_l) \quad (6)$$

where l=0, 1, 2, . . . , L−1; R$_2$'(f$_0$+lΔf) denotes the L frequency components of the set R$_2$'; R$_2$(f$_0$+lΔf) denotes the L frequency components of the set R$_2$; and exp(−jΦ$_l$) denotes the corresponding L complex values received by way of digital signal 338. A person of ordinary skill in the art will understand that the effect of the multiplication by the exponential factor used in Eq. (6) is the phase rotation for the corresponding complex value R$_2$. Multiplier 322b is further configured to supply the computed set R$_2$' to a demultiplexer 326b by way of a digital signal 324b.

Demultiplexer (DMUX) 326a is configured to demultiplex each received set R$_1$' into two subsets denoted in FIG. 3 as USB and LSB, respectively, where USB stands for the upper sideband, and LSB stands for the lower sideband. More specifically, the subset USB contains the frequency components of the set R$_1$' belonging to the sideband spectrally located near the clock-tone frequency (f$_c$+f$_1$), where f$_c$ is the carrier frequency, and f$_1$ is the nominal clock frequency. The subset LSB similarly contains the frequency components of the set R$_1$' belonging to the sideband spectrally located near the clock-tone frequency (f$_c$−f$_1$). The remaining frequency components of the set R$_1$' can typically be discarded, e.g., by being sunk into the middle output of DMUX 326a.

In an example embodiment, each of the subsets USB and LSB may contain 16 respective frequency components. In an alternative embodiment, each of the subsets USB and LSB may contain a different suitable number of frequency components.

DMUX 326b is similarly configured to (i) demultiplex each received set R$_2$' into two respective subsets USB and LSB, and (ii) discard the remainder of the set R$_2$'.

DMUX 326a is connected to apply the subsets USB and LSB of the set R$_1$' to a multiplier 350a and a conjugation module 346a, respectively. Conjugation module 346a is further connected to provide a second input to multiplier 350a. The output of multiplier 350a is connected to an averaging circuit 354a. In operation, conjugation module 346a, multiplier 350a, and averaging circuit 354a generate a complex-valued signal 356a in accordance with Eq. (7):

$$Z_a(k) = \frac{\sum_{USB,LSB} R_1'(f_{USB}) \times (R_1'(f_{LSB}))^*}{N_0} \quad (7)$$

where k is the time index that is incremented by one for each set of Fourier transforms computed by DFT modules 318; R$_1$'(f$_{USB}$) denotes the frequency components of the subset USB of the set R$_1$'; R$_1$'(f$_{LSB}$) denotes the frequency components of the subset LSB of the set R$_1$'; the "*" in the superscript denotes the complex conjugate; and N$_0$ is the number of frequency components in each of the subsets USB and LSB.

DMUX 326b is similarly connected to apply the subsets USB and LSB of the set R$_2$' to a multiplier 350b and a conjugation module 346b, respectively. Conjugation module 346b is further connected to provide a second input to multiplier 350b. The output of multiplier 350b is connected to an averaging circuit 354b. In operation, conjugation module 346b, multiplier 350b, and averaging circuit 354b generate a complex-valued signal 356b in accordance with Eq. (8):

$$Z_b(k) = \frac{\sum_{USB,LSB} R_2'(f_{USB}) \times (R_2'(f_{LSB}))^*}{N_0} \quad (8)$$

where R$_2$'(f$_{USB}$) denotes the frequency components of the subset USB of the set R$_2$'; R$_2$'(f$_{LSB}$) denotes the frequency components of the subset LSB of the set R$_2$'; the "*" in the superscript denotes the complex conjugate; and N$_0$ is the number of frequency components in each of the subsets USB and LSB.

In Eqs. (7)-(8), the frequency difference between the multiplied USB and LSB tones is 1/T, where T is the symbol period.

An averaging circuit 360 operates to further average the values of Z$_a$(k) and Z$_b$(k) received via signals 356a and 356b, respectively, to generate a corresponding value Z(k) for a complex-valued signal 362 in accordance with Eq. (9):

$$Z(k) = \frac{Z_a(k) + Z_b(k)}{2} \quad (9)$$

An argument module 364 is configured to compute the argument θ$_k$ of Z(k) in accordance with Eq. (10):

$$\theta_k = \arg(Z(k)) \quad (10)$$

In an example embodiment, module 364 may operate by (i) presenting the complex number Z(k) in the form of Z$_{0,k}$exp(jθ$_k$), where Z$_{0,k}$ and θ$_k$ are the complex-number amplitude and argument, respectively; and (ii) outputting the resulting value of θ$_k$ by way of a digital signal 366.

Note that Eq. (10) causes the values of $\theta_k$ to be constrained to the interval [0, 2π). As such, digital signal 366 provides the so-called wrapped phase whose value may be subject to discontinuities (sudden jumps) with the magnitude of 2π. An unwrap module 370 operates to remove the a discontinuities from signal 366, thereby generating a digital signal 372 carrying the corresponding values of the unwrapped phase $\Theta_k$.

A multiplier 374 is configured to normalize digital signal 372 by applying thereto the normalization coefficient ½π.

A modulo(1) module 378 is configured to compute a fractional error estimate E(k) by applying a modulo(1) operation to the output of multiplier 374. As a result, an output digital signal 380 generated by module 378 can be expressed using Eq. (11) as follows:

$$E(k)=(\Theta_k/2\pi)\bmod 1 \quad (11)$$

A clock-phase correction module 382 is configured to generate control signal 272 using the fractional-error estimates E(k) received, by way of digital signal 380, from module 378. The exact manner in which control signal 272 is generated depends on the implementation of interpolator 230. For example, when interpolator 230 is implemented using a 4th order Lagrange fractional-delay filter, control signal 272 can be configured to carry the filter coefficients $C_{-2}$, $C_{-1}$, $C_0$, and $C_1$ computed as follows:

$$C_{-2} = \frac{1}{6}\mu^3 - \frac{1}{6}\mu \quad (12a)$$

$$C_{-1} = -\frac{1}{2}\mu^3 + \frac{1}{2}\mu^2 + \mu \quad (12b)$$

$$C_0 = \frac{1}{2}\mu^3 - \mu^2 - \frac{1}{2}\mu + 1 \quad (12c)$$

$$C_1 = -\frac{1}{6}\mu^3 + \frac{1}{2}\mu^2 - \frac{1}{3}\mu \quad (12d)$$

where μ=E(k) or an average value of E(k) obtained by averaging the latter over several consecutive indices k.

A person of ordinary skill in the pertinent art will understand, without undue experimentation, how to use the fractional-error estimates E(k) for generating control signal 272 compatible with other suitable embodiments of interpolator 230.

Figure 4:
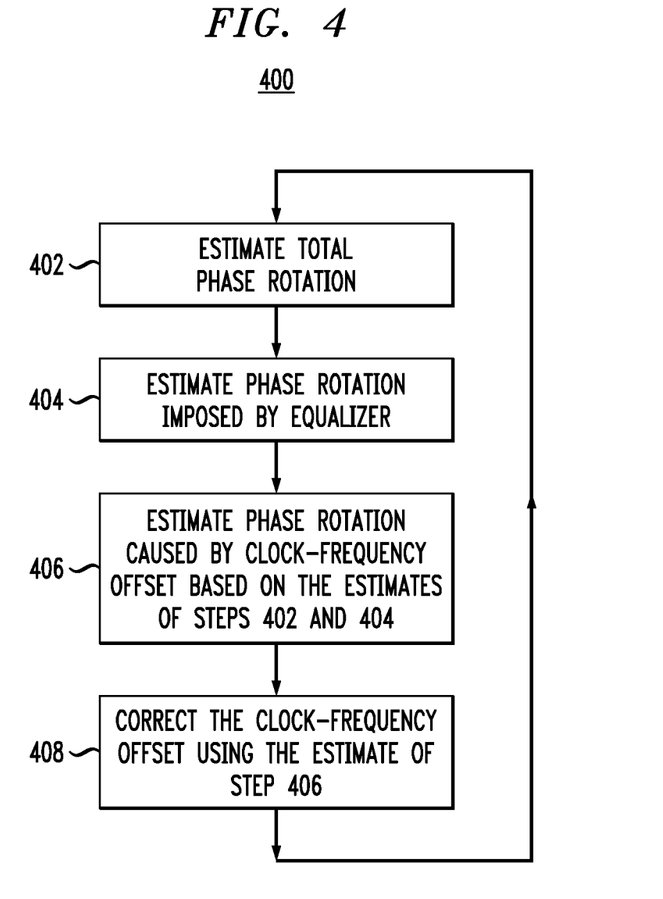
FIG. 4 shows a flowchart of a clock-recovery method that can be implemented in the DSP of FIG. 2 according to an embodiment.

FIG. 4 shows a flowchart of a clock-recovery method 400 according to an embodiment. As already indicated above, method 400 can be implemented in DSP 160 using clock-recovery circuit 270 (also see FIGS. 2, 3, and 5).

To better understand the signal processing corresponding to method 400, it should be noted that interpolator 230 (which receives control signal 272 from clock-recovery circuit 270) is located upstream from channel equalizer 240 (which is used to provide the input signals 242 and 244 to the clock recovery circuit, see FIG. 2). This circuit configuration creates two nested feedback loops, each with a phase-correction capability. More specifically, one of the feedback loops is the internal feedback loop (not explicitly shown in FIG. 2) used in channel equalizer 240. The other feedback loop is the feedback loop that includes clock-recovery circuit 270 (see FIG. 2).

Due to its intended function, channel equalizer 240 is typically designed to have a relatively limited dynamic range suitable for the signal equalization that reduces signal distortions accrued in the optical communication link between the transmitter and receiver. However, by its very nature, blind equalization (e.g., implemented using a suitable blind-equalization algorithm, such as the above-mentioned CMA) used in equalizer 240 will attempt to reduce any phase distortion, including the phase rotation caused by the typically present clock-frequency offset between the transmitter and receiver. If channel equalizer 240 is not prevented from doing the phase correction corresponding to the latter, then the dynamic range of the channel equalizer can be quickly exceeded, thereby causing a signal-processing breakdown in DSP 160. Method 400 is designed to prevent such signal-processing breakdowns by averting dynamic-range overflows in equalizer 240. In an example embodiment, the latter feature of method 400 can be achieved using steps 402-408 as follows.

At step 402, DSP 160 operates to estimate the total phase rotation corresponding to the data-signal path between interpolator 230 and carrier-recovery module 250. As indicated above, the total phase rotation is dominated by two sources. The first source is the phase rotation caused by the clock-frequency offset between the transmitter and receiver. The second source is the phase rotation corresponding to the equalization performed in channel equalizer 240.

For example, in the embodiment of clock-recovery circuit 270 shown in FIG. 3, step 402 is implemented using circuit modules 310*a,b* and 318*a,b*.

At step 404, DSP 160 operates to estimate the phase rotation corresponding to the equalization performed in channel equalizer 240. This estimate can be generated using the matrix elements of the transfer function H applied by channel equalizer 240.

For example, in the embodiment of clock-recovery circuit 270 shown in FIG. 3, step 404 is implemented using circuit modules 330 and 318*c*.

At step 406, DSP 160 operates to estimate the phase rotation caused by the clock-frequency offset between the transmitter and receiver. This estimate can be generated by properly subtracting the estimate generated at step 404 from the estimate generated at step 402.

For example, in the embodiment of clock-recovery circuit 270 shown in FIG. 3, step 406 is implemented using circuit modules 322*a,b*, 326*a,b*, 346*a,b*, 350*a,b*, 354*a,b*, 360, 364, and 370.

At step 408, DSP 160 operates to correct (e.g., reduce the absolute value and/or change the sign of) the current clock-frequency offset between the transmitter and receiver. This correction can be performed using the estimate generated at step 406.

For example, in the embodiment of clock-recovery circuit 270 shown in FIG. 3, step 408 is implemented using circuit modules 374, 378, and 382.

After step 408, the processing of method 400 can be directed back to step 402.

Figure 5:
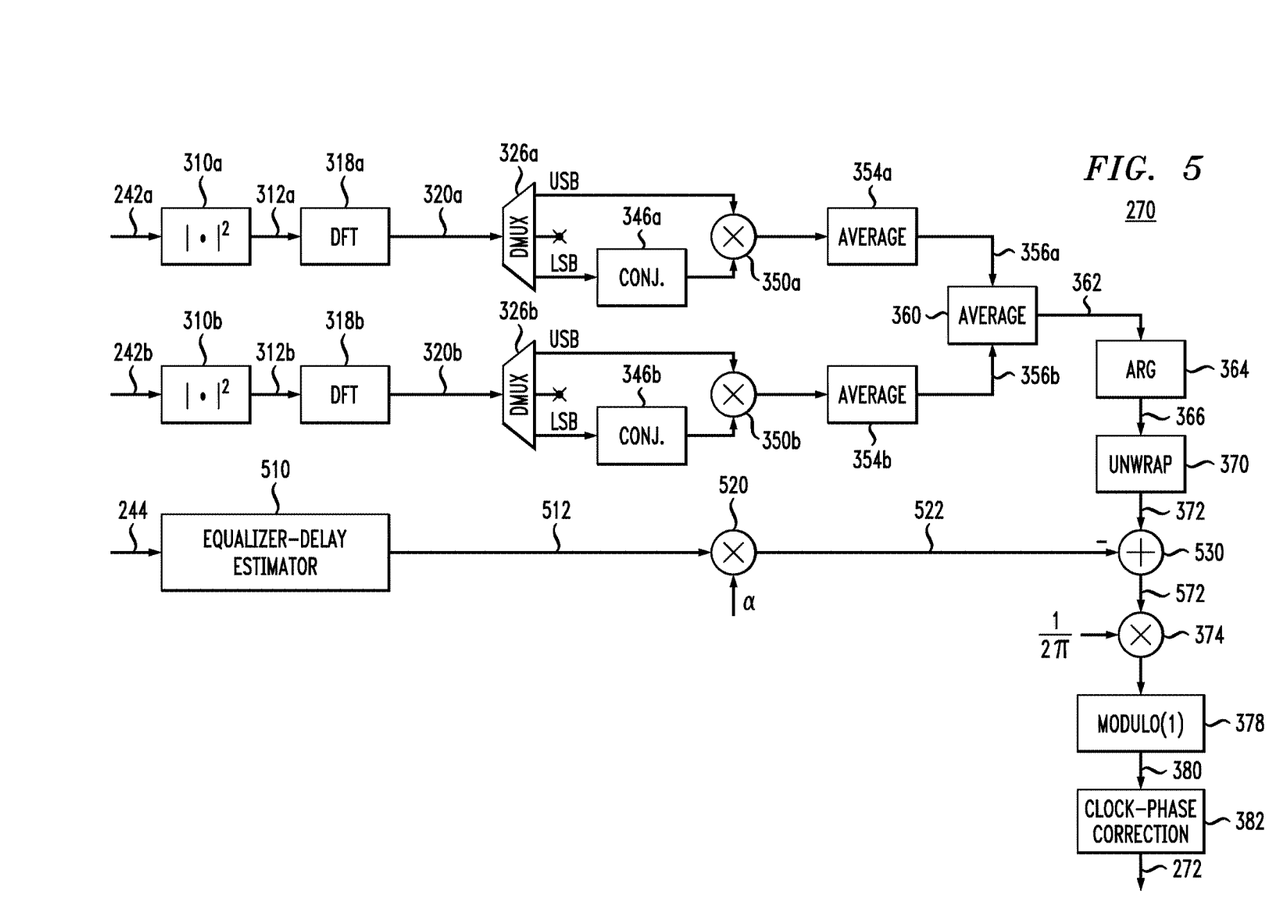
FIG. 5 shows a block diagram of a clock-recovery circuit that can be used in the DSP of FIG. 2 according to an alternative embodiment.

FIG. 5 shows a block diagram of clock-recovery circuit 270 according to another embodiment. This particular embodiment of clock-recovery circuit 270 is compatible with a time-domain implementation of channel equalizer 240. As such, in this embodiment, control signal 244 is configured to supply the transfer function H of channel equalizer 240 in the form of four sets of the tap coefficients ($C_{ij}^{(1)}$, $C_{ij}^{(2)}$, ..., $C_{ij}^{(M)}$), where i=1, 2 and j=1, 2.

The embodiment of clock-recovery circuit 270 shown in FIG. 5 reuses many of the circuit elements used in the embodiment of FIG. 3. These circuit elements are labeled in FIG. 5 using the same reference labels as in FIG. 3, and the description of these circuit elements is not repeated here. Rather, the description given below primarily focuses on the differences between the embodiments of FIGS. 3 and 5.

In the embodiment of FIG. 5, DMUX 326a is configured to receive digital signal 320a instead of digital signal 324a applied thereto in the embodiment of FIG. 3. As a result, complex-valued signal 356a is generated in accordance with Eq. (13):

$$Z_a(k) = \frac{\sum_{USB,LSB} R_1(f_{USB}) \times (R_1(f_{LSB}))^*}{N_0} \quad (13)$$

which is equivalent to Eq. (7), with the exception of the use of the set $R_1$ instead of the set $R_1'$ (see Eq. (7)). DMUX 326b is similarly configured to receive digital signal 320b instead of digital signal 324b applied thereto in the embodiment of FIG. 3. As a result, complex-valued signal 356b is generated in accordance with Eq. (14):

$$Z_b(k) = \frac{\sum_{USB,LSB} R_2(f_{USB}) \times (R_2(f_{LSB}))^*}{N_0} \quad (14)$$

which is equivalent to Eq. (8), with the exception of the use of the set $R_2$ instead of the set $R_2'$ (see Eq. (8)).

In the embodiment of FIG. 5, control signal 244 is applied to a mean-equalizer-delay (MED) estimator 510. In operation, MED estimator 510 computes, in accordance with Eq. (15), an estimate of the mean delay d corresponding to the data paths through channel equalizer 240 using the four sets of the tap coefficients ($C_{ij}^{(1)}, C_{ij}^{(2)}, \ldots, C_{ij}^{(M)}$) supplied by control signal 244 as follows:

$$d = \frac{1}{2}\text{Re}\left(\frac{P_{11}N_{22} + P_{22}N_{11} - P_{12}N_{21} - P_{21}N_{12}}{P_{11}P_{22} - P_{12}P_{21}}\right) \quad (15)$$

where the values of $P_{ij}$ and $N_{ij}$ are calculated in accordance with Eqs. (16) and (17), respectively:

$$P_{ij} = \sum_{m=1}^{M} C_{ij}^{(m)} \quad (16)$$

$$N_{ij} = \sum_{m=1}^{M} m C_{ij}^{(m)} \quad (17)$$

MED estimator 510 then outputs the computed estimates of d by way of a digital signal 512.

In the embodiment of FIG. 5, multiplier 374 is configured to receive a digital signal 572 instead of digital signal 372 applied thereto in the embodiment of FIG. 3. Digital signal 572 is generated by an adder 530 which is configured to modify digital signal 372 using an output signal 522 generated by a multiplier 520. As a result, digital signal 572 carries the values of modified unwrapped phase $\Theta'_k$ that can be expressed as follows:

$$\Theta'_k = \Theta_k - \alpha d \quad (18)$$

where $\Theta_k$ denotes the corresponding values of the unwrapped phase carried by digital signal 372; and $\alpha$ is a positive weighting coefficient applied by multiplier 520 to the mean-delay estimate d received from MED estimator 510. In an example embodiment, the coefficient $\alpha$ is an adjustable parameter of the clock-recovery algorithm whose value can be selected, e.g., for optimal performance.

Due to the changed input received by multiplier 374 in the embodiment of FIG. 5, digital signal 380 generated by module 378 can be expressed using Eq. (19) as follows:

$$E(k) = (\Theta'_k/2\pi) \bmod 1 \quad (19)$$

which is equivalent to Eq. (11), with the exception of the use of the modified unwrapped phase $\Theta'_k$ instead of the previously used unwrapped phase $\Theta_k$ (also see Eq. (11)).

Similar to the embodiment of FIG. 3, the embodiment of FIG. 5 implements a corresponding embodiment of method 400. More specifically, step 402 of method 400 is implemented using circuit modules 310a,b and 318a,b (FIG. 5). Step 404 is implemented using MED estimator 510. With respect to this implementation of step 404, a person of ordinary skill in the art will understand that phase rotation in the frequency domain manifests itself as a delay in the time domain, which is estimated using MED estimator 510. Step 406 is implemented using 322a,b, 326a,b, 346a,b, 350a,b, 354a,b, 360, 364, 370, 520, and 530 (FIG. 5). Step 408 is implemented using circuit modules 374, 378, and 382 (FIG. 5).

According to an example embodiment disclosed above, e.g., in the summary section and/or in reference to any one or any combination of some or all of FIGS. 1-5, provided is an apparatus comprising an optical data receiver (e.g., 100, FIG. 1) that comprises: an optical front end (e.g., 120/140/150, FIG. 1) configured to mix an optical data signal (e.g., 102, FIG. 1) and an optical local-oscillator signal (e.g., 112, FIG. 1) to generate a plurality of electrical digital measures (e.g., 152a-152d, FIG. 1) of the optical data signal; and a digital signal processor (e.g., 160, FIGS. 1, 2) configured to: generate a first plurality of digital samples (e.g., 238a and 238b, FIG. 2) in response to receiving the plurality of electrical digital measures from the optical front end, said generating being performed using a clock signal (e.g., 272, FIG. 2); generate a second plurality of digital samples (e.g., 242a and 242b, FIG. 2) by digitally filtering the first plurality of digital samples, said filtering being performed using a transfer function (e.g., $$H = \begin{pmatrix} h_{11} & h_{12} \\ h_{21} & h_{22} \end{pmatrix},$$

Eqs. (1a)-(1b)); generate the clock signal using the transfer function and at least some of the second plurality of digital samples; and recover data (e.g., 162, FIGS. 1, 2) encoded in the optical data signal using the second plurality of digital samples.

In some embodiments of the above apparatus, the digital signal processor comprises a signal interpolator (e.g., 230, FIG. 2) configured to generate the first plurality of digital samples (e.g., 238a and 238b, FIG. 2) by interpolating one or more digital signals (e.g., 222a and 222b, FIG. 2) representing the plurality of electrical digital measures, said interpolating being performed using the clock signal.

In some embodiments of any of the above apparatus, the digital signal processor comprises a digital filter (e.g., 240, FIG. 2) configured to generate a first stream of digital samples (e.g., 242a, FIG. 2) and a second stream of digital samples (e.g., 242b, FIG. 2) by applying the transfer function to the first plurality of digital samples; and wherein the second plurality of digital samples includes the first and second streams of digital samples.

In some embodiments of any of the above apparatus, the first stream of digital samples comprises digital samples corresponding to a first polarization of the optical data signal; and wherein the second stream of digital samples comprises digital samples corresponding to a second polarization of the optical data signal that is orthogonal to the first polarization.

In some embodiments of any of the above apparatus, the digital signal processor further comprises a clock-recovery circuit (e.g., 270, FIG. 2) configured to generate the clock signal in response to a selected one of the first and second streams of digital samples.

In some embodiments of any of the above apparatus, the clock-recovery circuit is further configured to generate the clock signal in response to receiving from the digital filter a plurality of values (e.g., 244, FIG. 2) representing the transfer function.

In some embodiments of any of the above apparatus, the digital signal processor comprises: a digital filter (e.g., 240, FIG. 2) configured to: (i) generate the second plurality of digital samples by applying the transfer function to the first plurality of digital samples; and (ii) generate a control signal (e.g., 244, FIG. 2) configured to carry a plurality of values representing the transfer function; and a clock-recovery circuit (e.g., 270, FIG. 2) configured to generate the clock signal in response to the control signal received from the digital filter.

In some embodiments of any of the above apparatus, the clock-recovery circuit is further configured to generate the clock signal in response to the at least some of the second plurality of digital samples (e.g., 242a or 242b, FIG. 2).

In some embodiments of any of the above apparatus, the digital filter is configured to generate the control signal such that the plurality of values includes two or more sets of complex values (e.g., $(H_{ij}^{(1)}, H_{ij}^{(2)}, \ldots, H_{ij}^{(M)})$ and Eq. (2)), each set representing a respective matrix element of the transfer function as a function of frequency.

In some embodiments of any of the above apparatus, the digital filter is configured to generate the control signal such that the plurality of values includes two or more sets of finite-impulse-response-filter tap coefficients (e.g., $(C_{ij}^{(1)}, C_{ij}^{(2)}, \ldots, C_{ij}^{(M)})$ of 244, FIG. 5), each set representing a respective matrix element of the transfer function.

In some embodiments of any of the above apparatus, the clock-recovery circuit is configured to: generate (e.g., 402, FIG. 4) a first estimate of phase rotation using the second plurality of digital samples; generate (e.g., 404, FIG. 4) a second estimate of phase rotation, the second estimate being an estimate of phase rotation in the digital filter; generate (e.g., 406, FIG. 4) a third estimate of phase rotation, the third estimate representing a frequency offset between the clock signal and a clock of the optical data signal, the third estimate being generated using the first and second estimates; and adjust (e.g., 408, FIG. 4) a phase of the clock signal using the third estimate.

In some embodiments of any of the above apparatus, the clock-recovery circuit comprises: a squaring module (e.g., 310a, FIG. 3) configured to generate squared absolute values of some (e.g., 342a, FIG. 3) of the second plurality of digital samples; a discrete-Fourier-transform module (e.g., 318a, FIG. 3) configured to generate a plurality of spectral samples by applying a Fourier transform to the squared absolute values; a first digital circuit (e.g., 330/318c, FIG. 3) configured to generate an estimate of phase rotation in the digital filter in response to the control signal; and a second digital circuit (e.g., 322a,b/326a,b/346a,b/350a,b/354a,b/360/364/ 374/378/382, FIG. 3) configured to adjust a phase of the clock signal using the plurality of spectral samples and the estimate of phase rotation.

In some embodiments of any of the above apparatus, the first digital circuit is configured to generate the estimate of phase rotation using a determinant (e.g., 332, FIG. 3; Eq. (4)) of the transfer function.

In some embodiments of any of the above apparatus, the clock-recovery circuit comprises: a squaring module (e.g., 310a, FIG. 5) configured to generate squared absolute values of a subset (e.g., 342a, FIG. 3) of the second plurality of digital samples; a discrete-Fourier-transform module (e.g., 318a, FIG. 5) configured to generate a plurality of spectral samples by applying a Fourier transform to the squared absolute values; a delay estimator (e.g., 510, FIG. 5) configured to generate an estimate of signal delay in the digital filter in response to receiving the control signal; and a digital circuit (e.g., part of 270, FIG. 5) configured to adjust a phase of the clock signal using the plurality of spectral samples and the estimate of signal delay.

In some embodiments of any of the above apparatus, the digital filter comprises a multiple-input/multiple-output channel equalizer (e.g., 240, FIG. 2).

In some embodiments of any of the above apparatus, the channel equalizer is configured to perform at least some of the following: electronic polarization demultiplexing; and digital filtering configured to reduce signal distortions caused by one or more of polarization-mode dispersion, polarization-dependent loss, inter-symbol interference, and chromatic dispersion.

In some embodiments of any of the above apparatus, the clock-recovery circuit comprises a first discrete-Fourier-transform module (e.g., 318a,b, FIG. 3) configured to generate L spectral samples by applying a Fourier transform to a corresponding set of input values (e.g., $R=\{R(f_0), R(f_0+\Delta f), \ldots, R(f_0+(L-1)\Delta f)\}$; 320, FIG. 3), where L is a positive integer greater than one; and wherein the digital filter comprises a finite-impulse-response filter of length M, where M is a positive integer that is different form L.

In some embodiments of any of the above apparatus, the clock-recovery circuit comprises a second discrete-Fourier-transform module (e.g., 318c, FIG. 3) configured to apply a zero-fill operation to a set of M input values to generate a corresponding set of L spectral samples, where L>M.

According to another example embodiment disclosed above, e.g., in the summary section and/or in reference to any one or any combination of some or all of FIGS. 1-5, provided is an apparatus comprising a digital signal processor (e.g., 160, FIGS. 1, 2) that comprises: a digital equalizing filter (e.g., 240, FIG. 2) configured to generate a second plurality of digital samples (e.g., 242a and 242b, FIG. 2) by digitally filtering a first plurality of digital samples, said filtering being performed using a transfer function (e.g., $$H = \begin{pmatrix} h_{11} & h_{12} \\ h_{21} & h_{22} \end{pmatrix},$$

Eqs. (1a)-(1b)), said first plurality of digital samples corresponding to an input data signal (e.g., 102, FIG. 1) and being generated using a clock signal (e.g., 272, FIG. 2); a clock-recovery circuit (e.g., 270, FIG. 2) configured to generate the clock signal using the transfer function and at least some of the second plurality of digital samples; and a signal decoder (e.g., 260, FIG. 2) configured to recover data (e.g., 162, FIGS. 1, 2) encoded in the input data signal using the second plurality of digital samples.

In some embodiments of the above apparatus, the digital signal processor further comprises a signal interpolator (e.g., 230, FIG. 2) configured to generate the first plurality of digital samples (e.g., 238a and 238b, FIG. 2) by interpolating one or more digital signals (e.g., 222a and 222b, FIG. 2) representing the input data signal, said interpolating being performed using the clock signal.

In some embodiments of any of the above apparatus, the digital signal processor further comprises: a signal interpolator (e.g., 230, FIG. 2) configured to generate the first plurality of digital samples by interpolating one or more digital signals representing the input data signal; and a feedback circuit path (e.g., 242/270/272, FIG. 2) that connects one or more outputs of the digital equalizing filter and the signal interpolator, the feedback circuit path including the clock-recovery circuit.

In some embodiments of any of the above apparatus, the clock-recovery circuit is further configured to receive from the digital equalizing filter a plurality of values (e.g., 244, FIG. 2) representing the transfer function.

While this disclosure includes references to illustrative embodiments, this specification is not intended to be construed in a limiting sense. Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Some embodiments may be implemented as circuit-based processes, including possible implementation on a single integrated circuit.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Throughout the detailed description, the drawings, which are not to scale, are illustrative only and are used in order to explain, rather than limit the disclosure.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

A person of ordinary skill in the art would readily recognize that steps of various above-described methods can be performed by programmed computers. Herein, some embodiments are intended to cover program storage devices, e.g., digital data storage media, which are machine or computer readable and encode machine-executable or computer-executable programs of instructions where said instructions perform some or all of the steps of methods described herein. The program storage devices may be, e.g., digital memories, magnetic storage media such as a magnetic disks or tapes, hard drives, or optically readable digital data storage media. The embodiments are also intended to cover computers programmed to perform said steps of methods described herein.

All statements herein reciting principles, aspects, and embodiments of the disclosure, as well as specific examples thereof, are intended to encompass equivalents thereof.

The functions of the various elements shown in the figures, including any functional blocks labeled as "processors" and/or "controllers," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

As used in this application, the term "circuitry" may refer to one or more or all of the following: (a) hardware-only circuit implementations (such as implementations in only analog and/or digital circuitry); (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

What is claimed is:

1. An apparatus comprising an optical data receiver that comprises:
    an optical front end that comprises:
        an optical hybrid configured to mix an optical data signal and an optical local-oscillator signal to generate a plurality of mixed optical signals; and
        a plurality of photodetectors configured to generate a plurality of electrical digital measures of the optical data signal in response to the mixed optical signals; and
    a digital signal processor that comprises:
        a digital equalizing filter configured to generate a second plurality of digital samples by digitally filtering a first plurality of digital samples, said filtering being based on a transfer function, said first plurality of digital samples being generated in response to the plurality of electrical digital measures and a clock signal, the digital equalizing filter being configured to generate a control signal carrying a plurality of values representing the transfer function;
        a clock-recovery circuit configured to generate the clock signal using at least some of the second plurality of digital samples and in response to the control signal generated by the digital equalizing filter; and
        a signal decoder configured to recover data encoded in the optical data signal using the second plurality of digital samples.

2. The apparatus of claim 1, wherein the digital signal processor further comprises a signal interpolator configured to generate the first plurality of digital samples by interpolating one or more digital signals representing the plurality of electrical digital measures, said interpolating being performed using the clock signal.

3. The apparatus of claim 1,
    wherein the digital equalizing filter is configured to generate a first stream of digital samples and a second stream of digital samples by applying the transfer function to the first plurality of digital samples; and
    wherein the second plurality of digital samples includes the first and second streams of digital samples.

4. The apparatus of claim 3,
    wherein the first stream of digital samples comprises digital samples corresponding to a first polarization of the optical data signal; and
    wherein the second stream of digital samples comprises digital samples corresponding to a second polarization of the optical data signal that is orthogonal to the first polarization.

5. The apparatus of claim 3, wherein the clock-recovery circuit is configured to generate the clock signal in response to a selected one of the first and second streams of digital samples.

6. The apparatus of claim 1, wherein the clock-recovery circuit is further configured to generate the clock signal in response to the at least some of the second plurality of digital samples.

7. The apparatus of claim 1, wherein the digital equalizing filter is configured to generate the control signal such that the plurality of values includes two or more sets of complex values, each set representing a respective matrix element of the transfer function as a function of frequency.

8. The apparatus of claim 1, wherein the digital equalizing filter is configured to generate the control signal such that the plurality of values includes two or more sets of finite-impulse-response-filter tap coefficients, each set representing a respective matrix element of the transfer function.

9. The apparatus of claim 1, wherein the clock-recovery circuit is configured to:
    generate a first estimate of phase rotation using the second plurality of digital samples;
    generate a second estimate of phase rotation, the second estimate being an estimate of phase rotation in the digital equalizing filter;
    generate a third estimate of phase rotation, the third estimate representing a frequency offset between the clock signal and a clock of the optical data signal, the third estimate being generated using the first and second estimates; and
    adjust a phase of the clock signal using the third estimate.

10. The apparatus of claim 1, wherein the clock-recovery circuit comprises:
    a squaring circuit configured to generate squared absolute values of some of the second plurality of digital samples;
    a discrete-Fourier-transform circuit configured to generate a plurality of spectral samples by applying a Fourier transform to the squared absolute values;
    a first digital circuit configured to generate an estimate of phase rotation in the digital equalizing filter in response to the control signal; and
    a second digital circuit configured to adjust a phase of the clock signal using the plurality of spectral samples and the estimate of phase rotation.

11. The apparatus of claim 10, wherein the first digital circuit is configured to generate the estimate of phase rotation using a determinant of the transfer function.

12. The apparatus of claim 1, wherein the clock-recovery circuit comprises:
    a squaring circuit configured to generate squared absolute values of a subset of the second plurality of digital samples;
    a discrete-Fourier-transform circuit configured to generate a plurality of spectral samples by applying a Fourier transform to the squared absolute values;

a delay-estimator circuit configured to generate an estimate of signal delay in the digital filter in response to receiving the control signal; and a digital circuit configured to adjust a phase of the clock signal using the plurality of spectral samples and the estimate of signal delay.

13. The apparatus of claim 1, wherein the digital equalizing filter comprises a multiple-input/multiple-output channel equalizer.

14. The apparatus of claim 13, wherein the channel equalizer is configured to perform at least some of the following:

electronic polarization demultiplexing; and digital filtering configured to reduce signal distortions caused by one or more of polarization-mode dispersion, polarization-dependent loss, inter-symbol interference, and chromatic dispersion.

15. The apparatus of claim 1, wherein the clock-recovery circuit comprises a first discrete-Fourier-transform circuit configured to generate L spectral samples by applying a Fourier transform to a corresponding set of input values, where L is a positive integer greater than one; and wherein the digital equalizing filter comprises a finite-impulse-response filter of length M, where M is a positive integer that is different form L.

16. The apparatus of claim 15, wherein the clock-recovery circuit comprises a second discrete-Fourier-transform circuit configured to apply a zero-fill operation to a set of M input values to generate a corresponding set of L spectral samples, where L>M.

17. The apparatus of claim 1, wherein the digital signal processor further comprises:

a signal interpolator configured to generate the first plurality of digital samples by interpolating one or more digital signals representing the plurality of electrical digital measures; and a feedback circuit path that connects one or more outputs of the digital equalizing filter and the signal interpolator, the feedback circuit path including the clock-recovery circuit.

18. An apparatus comprising a digital signal processor that comprises:

a digital equalizing filter configured to generate a second plurality of digital samples by digitally filtering a first plurality of digital samples, said filtering being based on a transfer function, said first plurality of digital samples corresponding to an input data signal and being generated using a clock signal, the digital equalizing filter being configured to generate a control signal carrying a plurality of values representing the transfer function;

a clock-recovery circuit configured to generate the clock signal using at least some of the second plurality of digital samples and in response to the control signal generated by the digital equalizing filter; and a signal decoder configured to recover data encoded in the input data signal using the second plurality of digital samples.

19. The apparatus of claim 18, wherein the digital signal processor further comprises a signal interpolator configured to generate the first plurality of digital samples by interpolating one or more digital signals representing the input data signal, said interpolating being performed using the clock signal.

20. The apparatus of claim 18, wherein the digital signal processor further comprises:

a signal interpolator configured to generate the first plurality of digital samples by interpolating one or more digital signals representing the input data signal; and a feedback circuit path that connects one or more outputs of the digital equalizing filter and the signal interpolator, the feedback circuit path including the clock-recovery circuit.

21. An apparatus comprising an optical data receiver that comprises:

an optical front end that comprises:

an optical hybrid configured to mix an optical data signal and an optical local-oscillator signal to generate a plurality of mixed optical signals; and a plurality of photodetectors configured to generate a plurality of electrical digital measures of the optical data signal in response to the mixed optical signals; and a digital signal processor that comprises:

a digital equalizing filter configured to generate a second plurality of digital samples by digitally filtering a first plurality of digital samples, said filtering being based on a transfer function, said first plurality of digital samples being generated in response to the plurality of electrical digital measures and a clock signal;

a clock-recovery circuit configured to generate the clock signal using at least some of the second plurality of digital samples and the transfer function;

a signal decoder configured to recover data encoded in the optical data signal using the second plurality of digital samples;

wherein the second plurality of digital samples comprises a first stream of digital samples corresponding to a first polarization of the optical data signal and a second stream of digital samples corresponding to a second polarization of the optical data signal that is orthogonal to the first polarization; and wherein the clock-recovery circuit is configured to generate the clock signal in response to a selected one of the first and second streams of digital samples.

* * * * *